United States Patent Office 3,053,787
Patented Sept. 11, 1962

3,053,787
COMPOSITION COMPRISING HYDROLIZED POLY-
VINYLACETATE, BISACRYLAMIDE MONOMER,
CERIC SALT AND CLAY
Tzeng Jiuez Suen, New Canaan, and Nicholas R. Segro, Stamford, Conn., assignors to American Cyanamid Company, New York, N.Y., a corporation of Maine
No Drawing. Filed Sept. 29, 1959, Ser. No. 843,078
4 Claims. (Cl. 260—29.6)

This invention relates to a composition of matter comprising a mixture of certain polyvinyl alcohol compositions, certain water-soluble alkylenebisacrylamides (and as an oxidizing agent for said polyvinyl alcohol), a small but effective amount of a water-soluble ceric salt. Still further, this invention relates to a composition of matter comprising a mixture of certain polyvinyl alcohol compositions, certain water-soluble monomeric alkylenebisacrylamides, certain water-soluble ceric salts and clay. Still further, this invention relates to aqueous solutions and/or dispersions of said compositions.

One of the objects of the present invention is to produce a composition of matter comprising a mixture of certain polyvinyl alcohol compositions, certain water-soluble alkylenebisacrylamides, and a water-soluble ceric salt. A further object of the present invention is to produce a composition of matter comprising a mixture of certain polyvinyl alcohol compositions, certain water-soluble alkylenebisacrylamides, certain water-soluble ceric salts and clay. A still further object of the present invention is to produce aqueous solutions and/or dispersions of said compositions. A still further object of the present invention is to produce an adhesive composition which will be useful primarily in bonding layers of paper to one another. These and other objects of the present invention will be discussed in greater detail hereinbelow.

Vinyl alcohol does not exist as such except perhaps transitorily in the monomeric state because of its lack of stability. Vinyl acetate, on the other hand, exists in a stable condition in the monomeric state. In order to produce polyvinyl alcohol compositions, one polymerizes vinyl acetate to the desired degree of polymerization and then hydrolyzes to the preferred degree of hydrolysis. The polyvinyl alcohol compositions of the present invention are those that have been hydrolyzed so as to have a degree of hydrolysis varying between about 70% and 100%. The molecular weight of these polyvinyl compositions may be varied over a substantial range such as between about 1,000 number average molecular weight and 5,000,000 weight average molecular weight. Preferably the molecular weight is about 10,000 to about 50,000 weight average molecular weight. The amount of polyvinyl alcohol composition used in the composition of the present invention may vary between about 50% and 97% by weight based on the total weight of said polyvinyl alcohol composition and said water-soluble monomeric alkylenebisacrylamide used therewith. Preferably one would use between about 70% and 90% by weight of said polyvinyl alcohol composition based on the total weight of said polyvinyl alcohol composition and said acrylamide.

The second component of the composition of the present invention is an N,N'-alkylenebisacrylamide. The preferred alkylenebisacrylamide is N,N'-methylenebisacrylamide. Reference is made to the U.S. Patent 2,475,- 846 which discloses a substantial plurality of these alkylenebisacrylamides. As we have indicated hereinabove, the amount of the water-soluble monomeric alkylenebisacrylamide used in the composition of the present invention will vary correspondingly with the amount of polyvinyl alcohol composition present. The variation will be between 50% to 3% by weight of said acrylamide based on the total weight of said acrylamide and said polyvinyl alcohol composition. Preferably one should use between about 30% and 10%, correspondingly, of said acrylamide based on the total weight of said acrylamide and said polyvinyl alcohol composition.

As the third component in the composition of the present invention, one utilizes a small but effective amount of a water-soluble ceric salt. This ceric salt need not be competely water-soluble but should be water-soluble to the extent to which it is utilized. The amount of ceric salt used may be varied so as to provide from about $10^{-6}$ to $10^{-1}$ mole of ceric ion per mole of monomeric alkylenebisacrylamide. Preferably, one would use between $10^{-3}$ to $10^{-2}$ mole of said ceric ion per mole of polymerizable monomer. Among the ceric salts which may be used in the practice of the process of the present invention are ceric nitrate, ceric sulfate, ceric ammonium nitrate, ceric ammonium sulfate, ceric ammonium pyrophosphate, ceric iodate, ceric perchlorate and the like. These ceric salts may be used either singly or in combination with one another.

It is possible to prepare compositions in keeping with the generic concept of the present invention which contain or are devoid of clay. It is actually preferred, however, to utilize clay in the compositions of the present invention. When clay is utilized, one may introduce between about 100% and 300% by weight of clay based on the total weight of the polyvinyl alcohol composition and the monomeric acrylamide. Preferably one utilizes about 120% to 200% by weight of clay, same basis. The type of clay utilized in some of the compositions of the present invention is conventionally used in polyvinyl alcohol composition adhesives and is described in considerable detail in U.S. Patent 2,487,448. Still further, if desired, one may modify the composition of the present invention by incorporating starch into the mix as is shown in Example 3 hereinbelow. The addition of the starch is also a conventional expedient and is shown in the same U.S. patent cited immediately hereinabove. The disclosure of said patent is incorporated herein by reference.

Since the compositions of the present invention will be utilized as adhesives primarily, it will be desirable in most instances to dissolve and/or disperse the dry solids of the various components in admixture in water. Thereupon the pH should be adjusted if necessary by the addition of acid material so as to adjust the pH to a value not greater than 6 and preferably not greater than 4. When the dry solids in admixture are dissolved and/or dispersed in water, the total amount of dry solids may be varied between about 10% and 40% by weight based on the total weight of dry solids and water. Preferably for most adhesive applications, the dry solids should be set at about 20%, same basis.

In preparing the aqueous solutions and/or dispersions of the present invention it is desirable to dissolve the polyvinyl alcohol composition with or without the other modifiers in water. This can be accomplished by stirring the composition in water at a temperature varying between about room temperature (i.e. 25° C.) and the boiling point of water. Preferably one would utilize a temperature of between about 70° and 90° C.

In order that the concept of the present invention may be more completely understood, the following examples are set forth in which all parts are parts by weight, unless otherwise indicated. These examples are set forth primarily for the purpose of illustration and any specific enumeration of detail set forth therein should not be interpreted as a limitation on the case except as is indicated in the appended claims.

EXAMPLE 1

Into a suitable mixing vessel there is introduced 12 parts of ASP 900 clay, 6 parts of polyvinyl alcohol (Elvanol 71–30), 2 parts of methylenebisacrylamide and 0.1097 part of ceric ammonium nitrate. These ingredients are thoroughly mixed together and then dispersed in 80 parts of water with the pH adjusted to 4.7.

EXAMPLE 2

Example 1 is repeated in every detail except that there is used only 78 parts of water and additionally there is added 2 parts of 1.0 n-nitric acid, thereby adjusting the pH to 2.1.

EXAMPLE 3

Into a suitable mixing vessel as in Example 1, there is introduced 12 parts of ASP 900 clay, 4 parts of polyvinyl alcohol (Elvanol 71–30), and 4 parts of starch (Globe Pearl #144). These ingredients are thoroughly blended and are then dispersed in 80 parts of water.

EXAMPLE 4

Into a suitable reaction vessel as in Example 1, there is blended 12 parts of ASP 900 clay and 8 parts of polyvinyl alcohol (Elvanol 71–30). The ingredients are blended together and then are dispersed in 80 parts water.

EXAMPLE 5

Example 1 is repeated in every detail except that the amount of ceric ammonium nitrate is 0.2194 part. The pH is adjusted to 3.3.

EXAMPLE 6

12 parts of polyvinyl alcohol and 88 parts of water are introduced into a suitable reaction vessel equipped as in Example 1. The pH is adjusted to 6.5.

EXAMPLE 7

Into a suitable reaction vessel equipped as in Example 1 there is introduced 9 parts of polyvinyl alcohol (Elvanol 71–30), 3 parts of methylenebisacrylamide, 0.1097 part of ceric ammounium nitrate. These ingredients are thoroughly mixed together and then dispersed in 88 parts of water with the pH adjusted to 4.9.

In each of the above examples, the aqueous dispersion was stirred for 30 minutes at 90° C. The products are then allowed to cool to room temperature for about 2 hours and then used to make 2-ply paper assemblies. Utilizing untreated kraft paper, 2-ply assemblies were prepared with each of the adhesives of Examples 1 to 7 inclusive, air-dried for 15 hours at room temperature and tested by subjecting the samples of the plies to water at 45° C., 60° C., and 75° C. for one hour. The results are shown in Table I.

Table I

[Effects of 1-hour immersion in $H_2O$]

| Ex. No. | Final pH ±0.1[a] | 45° C. | 60° C. | 75° C. |
|---|---|---|---|---|
| 1 | 4.7 | I.G.L.[b] | I.G.L. | C.F.G.L.[c] |
| 2 | 2.1 | I.G.L. | I.G.L. | |
| 3 | | 10% P.F.[d] | C.F.G.L. | |
| 4 | 6.0 | I.G.L. | 50% P.F. | C.F.G.L. |
| 5 | 3.3 | I.G.L. | I.G.L. | |
| 6 | 6.5 | I.G.L. | 17% P.F. | |
| 7 | 4.9 | I.G.L. | 45% P.F. | |

[a] Glass electrode. Measured at 25±1° C.
[b] I.G.L.=Indestructable glue line.
[c] C.F.G.L.=Complete failure of glue line.
[d] P.F.=Paper failure; sample otherwise showed failure at glue line.

We claim:

1. A composition of matter comprising an aqueous dispersion of a mixture of (1) from 50% to 97% by weight of a hydrolyzed polyvinyl acetate composition having a degree of hydrolysis varying between about 70% and 100%, (2) correspondingly from 50% to 3% by weight of methylenebisacrylamide, (3) a water-soluble ceric salt in an amount sufficient to provide from about $10^{-6}$ to $10^{-1}$ mole of ceric ion per mole of said monomeric bisacrylamide, and (4) from about 100% to about 300% by weight of clay based on the total weight of (1) and (2).

2. A composition of matter comprising a mixture of (1) from 50% to 97% by weight of a hydrolyzed polyvinyl acetate composition having a degree of hydrolysis varying between about 70% and 100%, (2) correspondingly from 50% to 3% by weight of a water-soluble monomeric alkylenebisacrylamide, (3) a water-soluble ceric salt in an amount sufficient to provide from about $10^{-6}$ to $10^{-1}$ mole of ceric ion per mole of said monomeric bisacrylamide, and (4) from about 100% to about 300% by weight of clay based on the total weight of (1) and (2).

3. A composition of matter comprising an aqueous dispersion of a mixture of (1) from 50% to 97% by weight of a hydrolyzed polyvinyl acetate composition having a degree of hydrolysis varying between about 70% and 100%, (2) correspondingly from 50% to 3% by weight of a water-soluble monomeric alkylenebisacrylamide, (3) a water-soluble ceric salt in an amount sufficient to provide from about $10^{-6}$ to $10^{-1}$ mole of ceric ion per mole of said monomeric bisacrylamide, and (4) from about 100% to about 300% by weight of clay based on the total weight of (1) and (2).

4. A composition of matter comprising a mixture of (1) from 50% to 97% by weight of a hydrolyzed polyvinyl acetate composition having a degree of hydrolysis varying between about 70% and 100%, (2) correspondingly from 50% to 3% by weight of methylenebisacrylamide, (3) a water-soluble ceric salt in an amount sufficient to provide from about $10^{-6}$ to $10^{-1}$ mole of ceric ion per mole of said monomeric bisacrylamide, and (4) from about 100% to about 300% by weight of clay based on the total weight of (1) and (2).

References Cited in the file of this patent

UNITED STATES PATENTS

| | | |
|---|---|---|
| 2,413,570 | Krister et al. | Dec. 11, 1946 |
| 2,487,448 | Kingerley | Nov. 8, 1949 |
| 2,804,436 | Ritson | Aug. 27, 1957 |
| 2,922,768 | Mino et al. | Jan. 26, 1960 |